(12) United States Patent
Kayahara

(10) Patent No.: US 11,951,756 B2
(45) Date of Patent: Apr. 9, 2024

(54) PRINTING APPARATUS AND PRINTING METHOD

(71) Applicant: SEIKO EPSON CORPORATION, Tokyo (JP)

(72) Inventor: Naoki Kayahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 250 days.

(21) Appl. No.: 17/456,655

(22) Filed: Nov. 29, 2021

(65) Prior Publication Data

US 2022/0169041 A1 Jun. 2, 2022

(30) Foreign Application Priority Data

Nov. 30, 2020 (JP) .................................. 2020-197951

(51) Int. Cl.
| | |
|---|---|
| *B41J 3/407* | (2006.01) |
| *B41J 3/28* | (2006.01) |
| *B41J 11/00* | (2006.01) |

(52) U.S. Cl.
CPC .............. *B41J 3/4078* (2013.01); *B41J 3/28* (2013.01); *B41J 11/008* (2013.01)

(58) Field of Classification Search
CPC .............................. B41J 3/4078; B41J 29/393
See application file for complete search history.

(56) References Cited

U.S. PATENT DOCUMENTS

| | | | |
|---|---|---|---|
| 2003/0030686 A1* | 2/2003 | Abe ....................... | B41J 3/4078 347/16 |
| 2004/0239705 A1 | 12/2004 | Arikita | |
| 2010/0194807 A1 | 8/2010 | Hirasawa et al. | |
| 2011/0188071 A1 | 8/2011 | Yoshida | |
| 2015/0283825 A1* | 10/2015 | Takai ..................... | G06F 3/1256 347/9 |
| 2017/0148154 A1 | 5/2017 | Nakao | |

FOREIGN PATENT DOCUMENTS

| | | |
|---|---|---|
| JP | H11-300949 A | 11/1999 |
| JP | 2007-313717 A | 12/2007 |

(Continued)

OTHER PUBLICATIONS

Kayahara, Machine TranslationofJP-2021084360-A, 2021 (Year: 2021).*

*Primary Examiner* — Scott A Richmond
(74) *Attorney, Agent, or Firm* — Global IP Counselors, LLP

(57) ABSTRACT

A printing apparatus includes a pattern correction unit configured to change a mutual positional relationship among a plurality of divided pieces of first image data obtained by dividing first image data representing a first pattern formed in a fabric to generate corrected first image data having a center made up of four corners of the first image data, a pattern extracting unit configured to compare the corrected first image data with second image data generated by imaging the fabric to extract a pattern region corresponding to a second pattern represented by the corrected first image data from the second image data, a printing image generation unit configured to arrange third image data representing an image to be printed overlaid on the first pattern so as to match a region having centers of the pattern regions as four corners to generate printing image data, and a printing control unit.

1 Claim, 14 Drawing Sheets

(56) References Cited

FOREIGN PATENT DOCUMENTS

| JP | 2010-179544 A | 8/2010 | | |
|---|---|---|---|---|
| JP | 2017-096750 A | 6/2017 | | |
| JP | 2021084360 A | * 6/2021 | ............ | B41J 15/165 |
| WO | 2003/031190 A1 | 1/2005 | | |
| WO | 2017/142718 A1 | 8/2017 | | |

\* cited by examiner

PRINTING APPARATUS AND PRINTING METHOD

The present application is based on, and claims priority from JP Application Serial Number 2020-197951, filed Nov. 30, 2020, the disclosure of which is hereby incorporated by reference herein in its entirety.

BACKGROUND

1. Technical Field

The present disclosure relates to a printing apparatus and a printing method.

2. Related Art

A technique has been known for searching an inspection target image for a candidate having similar characteristics to a model image obtained by imaging a good product serving as a model of the product (see JP 2017-96750 A).

Here, it is assumed that, when a fabric formed with a pattern is used as a printing medium, the pattern is extracted from a captured image obtained by imaging the fabric transported. Such extraction is performed for generation of printing data for coloring a design in accordance with a position and a shape of the pattern. However, information obtained as an extraction result of the pattern from the captured image is often limited information such as only center coordinates of the pattern. Therefore, in order to generate the printing data, four corners of a pattern region need to be further determined by interpolation operations or the like based on the information obtained as the extraction result of the pattern, and a computation burden was large.

SUMMARY

A printing apparatus includes a transport unit configured to transport a fabric formed with a first pattern in a transport direction, an imaging unit configured to image the fabric transported by the transport unit, a printing unit configured to perform printing on the fabric transported by the transport unit, a pattern correction unit configured to change a mutual positional relationship among a plurality of divided pieces of first image data obtained by dividing first image data representing the first pattern to generate corrected first image data having a center made up of four corners of the first image data, a pattern extracting unit configured to compare the corrected first image data with second image data generated by imaging the fabric by the imaging unit to extract a pattern region corresponding to a second pattern represented by the corrected first image data from the second image data, a printing image generation unit configured to arrange third image data representing an image to be printed overlaid on the first pattern so as to match a region having, as four corners, centers of a plurality of the pattern regions extracted to generate printing image data, and a printing control unit configured to cause the printing unit to print the printing image data on the fabric.

A printing apparatus includes a transport unit configured to transport a fabric formed with a first pattern in a transport direction, an imaging unit configured to image the fabric transported by the transport unit, a printing unit configured to perform printing on the fabric transported by the transport unit, a pattern extracting unit configured to compare first image data representing the first pattern with second image data generated by imaging the fabric by the imaging unit to extract a pattern region corresponding to the first pattern from the second image data, an image correction unit configured to change a mutual positional relationship among a plurality of divided pieces of third image data obtained by dividing third image data representing an image to be printed overlaid on the first pattern to generate corrected third image data having a center made up of four corners of the third image data, a printing image generation unit configured to arrange the corrected third image data so as to match a region having, as four corners, centers of a plurality of the pattern regions extracted to generate printing image data, and a printing control unit configured to cause the printing unit to print the printing image data on the fabric.

A printing apparatus includes a transport unit configured to transport a fabric formed with a first pattern in a transport direction, an imaging unit configured to image the fabric transported by the transport unit, a printing unit configured to perform printing on the fabric transported by the transport unit, a pattern correction unit configured to divide corrected first image data obtained by adding a margin region around first image data representing the first pattern to generate a plurality of divided pieces of corrected first image data having four corners of the first image data as respective centers, a pattern extracting unit configured to compare the plurality of divided pieces of corrected first image data with second image data generated by imaging the fabric by the imaging unit to extract, from the second image data, a plurality of pattern regions corresponding to patterns represented respectively by the plurality of divided pieces of corrected first image data, a printing image generation unit configured to arrange third image data representing an image to be printed overlaid on the first pattern so as to match a region having, as four corners, centers of a plurality of the pattern regions extracted to generate printing image data, and a printing control unit configured to cause the printing unit to print the printing image data on the fabric.

A printing method includes a transport step for transporting a fabric formed with a first pattern in a transport direction, an imaging step for imaging the fabric transported, a pattern correction step for changing a mutual positional relationship among a plurality of divided pieces of first image data obtained by dividing first image data representing the first pattern to generate corrected first image data having a center made up of four corners of the first image data, a pattern extraction step for comparing the corrected first image data with second image data generated by imaging the fabric to extract a pattern region corresponding to a second pattern represented by the corrected first image data from the second image data, a printing image generation step for arranging third image data representing an image to be printed overlaid on the first pattern so as to match a region having, as four corners, centers of a plurality of the pattern regions extracted to generate printing image data, and a printing step for printing the printing image data on the fabric transported.

A printing method includes a transport step for transporting a fabric formed with a first pattern in a transport direction, an imaging step for imaging the fabric transported, a pattern extraction step for comparing first image data representing the first pattern with second image data generated by imaging the fabric to extract a pattern region corresponding to the first pattern from the second image data, an image correction step for changing a mutual positional relationship among a plurality of divided pieces of third image data obtained by dividing third image data representing an image to be printed overlaid on the first pattern to generate corrected third image data having a center made up of four corners of the third image data, a printing image generation step for arranging the corrected third image data so as to match a region having, as four corners, centers of a plurality of the pattern regions extracted to generate printing image data, and a printing step for printing the printing image data on the fabric transported.

A printing method includes a transport step for transporting a fabric formed with a first pattern in a transport direction, an imaging step for imaging the fabric transported, a pattern correction step for dividing corrected first image data obtained by adding a margin region around first image data representing the first pattern to generate a plurality of divided pieces of corrected first image data having four corners of the first image data as respective centers, a pattern extraction step for comparing the plurality of divided pieces of corrected first image data with second image data generated by imaging the fabric to extract, from the second image data, a plurality of pattern regions corresponding to patterns represented respectively by the plurality of divided pieces of corrected first image data, a printing image generation step for arranging third image data representing an image to be printed overlaid on the first pattern so as to match a region having, as four corners, centers of a plurality of the pattern regions extracted to generate printing image data, and a printing step for printing the printing image data on the fabric transported.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes may not be precise, match each other, or some may be omitted.

Figure 1:
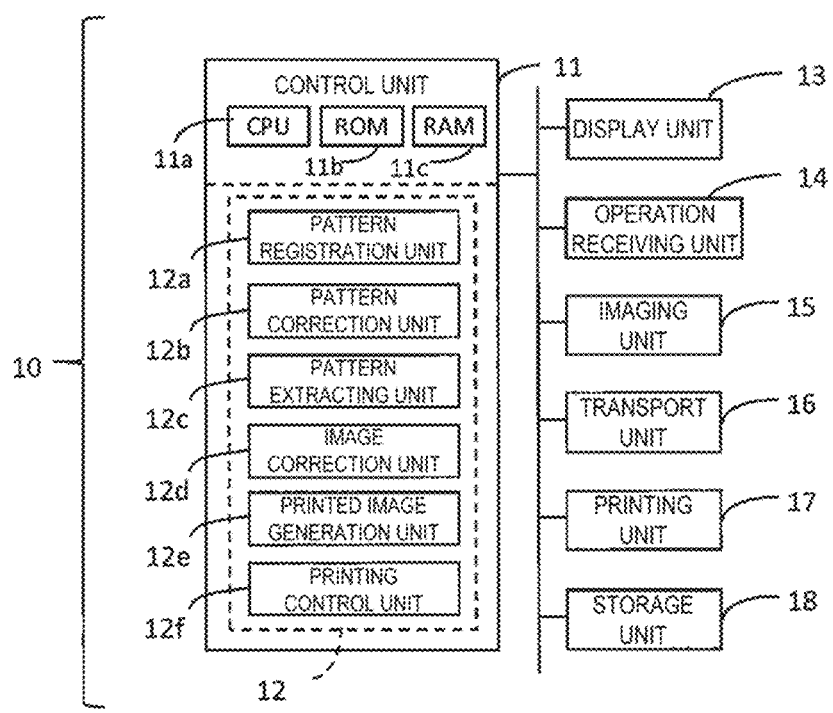
FIG. 1 is a block diagram illustrating a configuration of a printing apparatus in a simplified manner.

1. Apparatus Configuration:

FIG. 1 illustrates a configuration of a printing apparatus 10 according to the embodiment, in a simplified manner.

The printing apparatus 10 performs a printing method. The printing apparatus 10 is provided with a control unit 11, a display unit 13, an operation receiving unit 14, an imaging unit 15, a transport unit 16, a printing unit 17, a storage unit 18, and the like. The control unit 11 is configured to include, as a processor, one or more ICs including a CPU 11a, a ROM 11b, a RAM 11c, and the like, another non-volatile memory, and the like.

In the control unit 11, the processor, that is, the CPU 11a executes arithmetic processing in accordance with one or more programs 12 stored in the ROM 11b, the other memory, or the like, using the RAM 11c or the like as a work area, to control the printing apparatus 10. The control unit 11 functions, in accordance with the program 12, as a pattern registration unit 12a, a pattern correction unit 12b, a pattern extracting unit 12c, an image correction unit 12d, a printing image generation unit 12e, a printing control unit 12f, and the like. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13. The display unit 13 and the operation receiving unit 14 may be part of the configuration of the printing apparatus 10, or may be peripheral devices externally coupled to the printing apparatus 10.

The transport unit 16 is a mechanism for transporting a printing medium under control by the control unit 11. In the present exemplary embodiment, a fabric is assumed, as the printing medium, in which a stereoscopic pattern is formed by devising a weaving method of yarns and fibers, such as a jacquard woven fabric or a lace fabric. In the fabric, a certain pattern or a set of certain patterns are formed so as to be aligned repeatedly. In the following, a pattern or a set of patterns will be treated as one pattern.

The transport unit 16 includes, for example, a feeding roller for feeding a fabric before printing, which is wound in a roll shape, to downstream of transport, a belt or roller for further transporting the fabric fed, a winding roller for winding the fabric after the printing in a roll shape and collecting the fabric, a motor for rotating each roller or belt, or the like. In the following, upstream, and downstream of a transport direction by the transport unit 16 are described simply as upstream, and downstream.

The imaging unit 15 images the fabric transported by the transport unit 16 under control by the control unit 11. The imaging unit 15 has a configuration such as a light source that irradiates the fabric, an imaging element that receives reflected light from the fabric, and generates and outputs image data as an imaging result, or the like.

The printing unit 17 performs printing on the fabric transported by the transport unit 16 under control by the control unit 11. The printing unit 17 is provided downstream from the imaging unit 15. The printing unit 17 performs printing on the fabric based on printing image data transmitted from the control unit 11. The printing unit 17 can perform printing by discharging ink of a plurality of colors such as cyan, magenta, yellow, and black, for example, by an ink-jet method. According to the ink-jet method, the printing unit 17 performs printing on the fabric by discharging dots of ink from a nozzle (not illustrated) based on printing image data defining dot on or dot off of each ink for each pixel.

The storage unit 18 is a storage method such as a non-volatile memory or a hard disk drive. The storage unit 18 may be interpreted as a part of the control unit 11. Additionally, the RAM 11c may be interpreted as a part of the storage unit 18.

The printing apparatus 10 may be referred to as a recording device, an image forming device, a printer, or the like. The printing apparatus 10 may be realized not only by a single independent device, but also by a plurality of devices communicatively coupled to each other via a communication interface or a network. The printing apparatus 10 configured by a plurality of devices may be referred to as a printing system 10.

The printing system 10 is configured to include, for example, a printer including the imaging unit 15, the transport unit 16, and the printing unit 17, and one or more information processing devices that function as the control unit 11. The information processing device is, for example, a personal computer (PC), a server, a smart phone, a tablet terminal, or a device having the same degree of processing capability as those devices. In the printing system 10, a device serving as the control unit 11 may be referred to as an image processing apparatus, a printing control device, or the like. Of course, some devices that configure the printing system 10 may be considered as an invention.

Figure 2A:
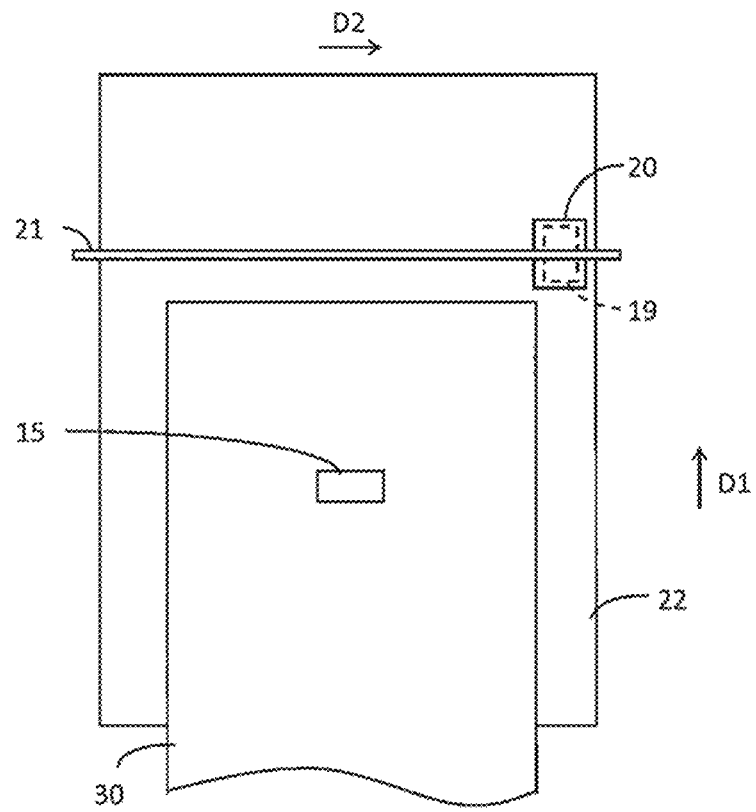
FIG. 2A is a view illustrating a configuration of a fabric to be transported and a vicinity thereof in a perspective facing downward from above.

FIG. 2A illustrates a configuration of a fabric 30 to be transported and a vicinity of the fabric 30 in a perspective facing downward from above. In FIG. 2A, a depiction of a pre-formed pattern in the fabric 30 is omitted. In FIG. 2A, a transport direction of the fabric 30 by the transport unit 16 is denoted by a reference sign D1. A reference sign 22 denotes an endless belt 22 as a portion of the transport unit 16. The fabric 30 in a state of being placed on the endless belt 22 is transported from upstream to downstream by the endless belt 22 rotating.

As illustrated in FIG. 2A, a carriage 20 is arranged above the endless belt 22. The carriage 20 can reciprocate along a direction D2 that intersects the transport direction D1. Although the intersection here is orthogonal, it may be understood that orthogonal includes not only strict orthogonality, but also errors that occur in product manufacturing. The carriage 20 moves along an elongated guide member 21 in the direction D2. The direction D2 is also referred to as a main scanning direction of the carriage 20 and a printing head 19. The direction D2 is also referred to as a width direction of the fabric 30.

The carriage 20 is equipped with the printing head 19. That is, the printing head 19 reciprocates along the width direction D2 with the carriage 20. Such a carriage 20 and a printing head 19 configure the printing unit 17. Although not illustrated, a plurality of nozzles open on a lower surface opposite the endless belt 22 in the printing head 19. The printing head 19 discharges ink from the nozzle based on printing image data while moving along the width direction D2 with the carriage 20.

As illustrated in FIG. 2A, the imaging unit 15 is arranged above the endless belt 22 at a predetermined position upstream of the carriage 20 and the printing head 19.

Figure 2B:
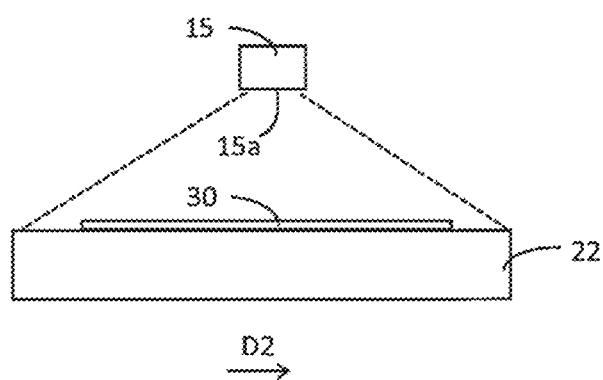
FIG. 2B is a view illustrating a part of the configuration illustrated in FIG. 2A in a perspective facing downstream from upstream.

FIG. 2B illustrates a part of the configuration illustrated in FIG. 2A in a perspective facing downstream from upstream. The imaging unit 15 has a lower surface opposite the endless belt 22 as an imaging surface 15a, and images the fabric 30 above the endless belt 22 via the imaging surface 15a. The imaging unit 15 is, for example, a line scan type camera in which a plurality of imaging elements are arranged inside thereof in the width direction D2. The imaging unit 15 repeats imaging on a line-by-line basis via a lens (not illustrated) and the imaging element provided at the imaging surface 15a. In FIG. 2B, an imaging range in the width direction D2 by the imaging unit 15 is illustrated by dashed lines. The imaging unit 15 is capable of imaging approximately an entire range of the endless belt 22 in the width direction D2 by a function of the lens.

The configuration of the imaging unit 15 is not limited to the example of FIGS. 2A and 2B. For example, a configuration may be adopted in which a plurality of the imaging units 15 are arranged above the endless belt 22 along the width direction D2, and each of the plurality of imaging units 15 takes charge of a partial range of the entire range of the endless belt 22 in the width direction D2 and performs imaging. Alternatively, the imaging unit 15 may be a line sensor configured by arranging the plurality of imaging elements over approximately the entire range of the endless belt 22 in the width direction D2. Alternatively, similar to the printing head 19 mounted on the carriage 20, the imaging unit 15 may be configured to be mounted on a carriage that can move along the width direction D2, and to image above the endless belt 22 while moving in the width direction D2 by the carriage.

Several exemplary embodiments of the printing method will be described below.

2. First Exemplary Embodiment

Figure 3:
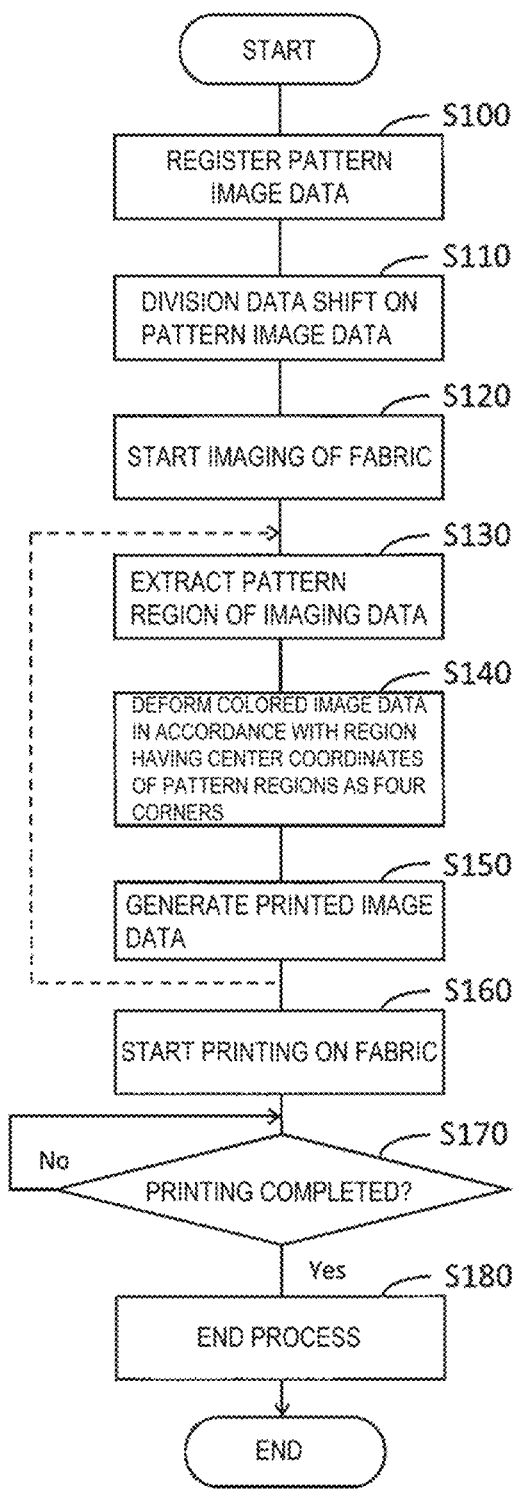
FIG. 3 is a flowchart illustrating printing processing according to a first exemplary embodiment.

FIG. 3 illustrates, by a flowchart, printing processing according to a first exemplary embodiment that the control unit 11 performs in accordance with the program 12.

In step S100, the pattern registration unit 12a of the control unit 11 registers pattern image data representing a pattern formed in the fabric 30 with the storage unit 18. The pattern image data corresponds to "first image data", and step S100 corresponds to a registration step.

Figure 4:
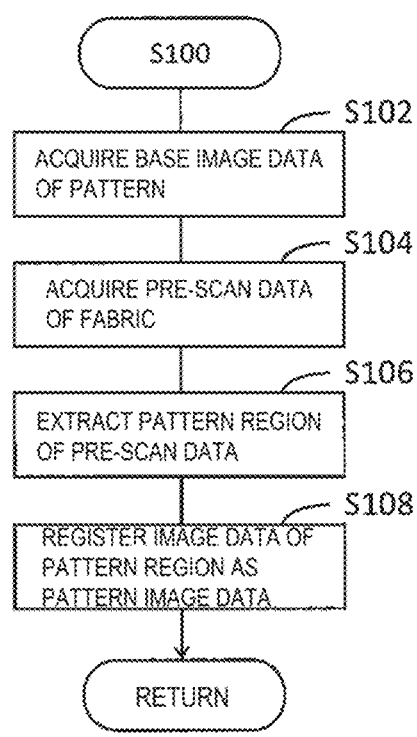
FIG. 4 is a flowchart illustrating details of step S100.

FIG. 4 illustrates details of step S100 by a flowchart.

In step S102, the pattern registration unit 12a acquires base image data representing the pattern in the fabric 30. The fabric 30 is a woven fabric in which, for example, one pattern designed by a designer is woven repeatedly. Therefore, it is assumed that the base image data is image data representing the one pattern that is generated in advance using predetermined software for design or drawing. The pattern registration unit 12a is input with base image data stored in a PC from the PC external to the printing apparatus 10, for example, in accordance with a user operation, and stores the input base image data in the storage unit 18.

In step S104, the pattern registration unit 12a acquires pre-scan data, which is image data generated by pre-scan of the fabric 30. The pre-scan means reading or imaging that is performed before imaging of the fabric 30 to be started in step S110 described below. For example, a user causes a scanner external to the printing apparatus 10 to scan the fabric 30 in advance. Then, the pattern registration unit 12a is input with image data generated by this scan from the scanner, and stores the image data as pre-scan data in the storage unit 18.

Alternatively, the pre-scan may be performed by the imaging unit 15. For example, the control unit 11 causes the transport unit 16 to start transporting the fabric 30, and causes the transport of the fabric 30 to stop at timing at which a tip of the fabric 30 reaches a position, which is downstream from the imaging unit 15 by a predetermined distance. The tip of the fabric 30 is an end portion facing downstream of the fabric 30. The imaging unit 15 images the fabric 30 passing by transporting under the imaging unit 15, and the pattern registration unit 12a is input with image data generated by this imaging from the imaging unit 15 and stores the image data as pre-scan data in the storage unit 18.

In step S106, the pattern registration unit 12a compares the base image data acquired in step S102 with the pre-scan data acquired in step S104 to extract, in the pre-scan data, a pattern region corresponding to one pattern of the fabric 30. At this time, the pattern registration unit 12a uses an image recognition technology to extract an image region with higher similarity with the base image data in the pre-scan data, and uses this image region as the pattern region.

Then, in step S108, the pattern registration unit 12a stores image data corresponding to the pattern region extracted in step S106 in the storage unit 18 as pattern image data. With the above, the registration of the pattern image data is completed.

According to the description according to FIG. 4, the pattern image data can be said to be at least a part of the pre-scan data.

However, the pattern registration unit 12a may simplify step S100 by registering base image data itself with the storage unit 18 as pattern image data.

In step S110, the pattern correction unit 12b changes a mutual positional relationship among a plurality of divided pieces of pattern image data with respect to the pattern image data registered in step S100, and performs a process for converting the pattern image data into corrected pattern image data having a center made up of four corners of the pattern image data. The process for the pattern image data in step 110 is referred to as a "division data shift". The divided pattern image data corresponds to "divided first image data" and the corrected pattern image data corresponds to "corrected first image data". Step S110 corresponds to a "pattern correction step".

Figure 5:
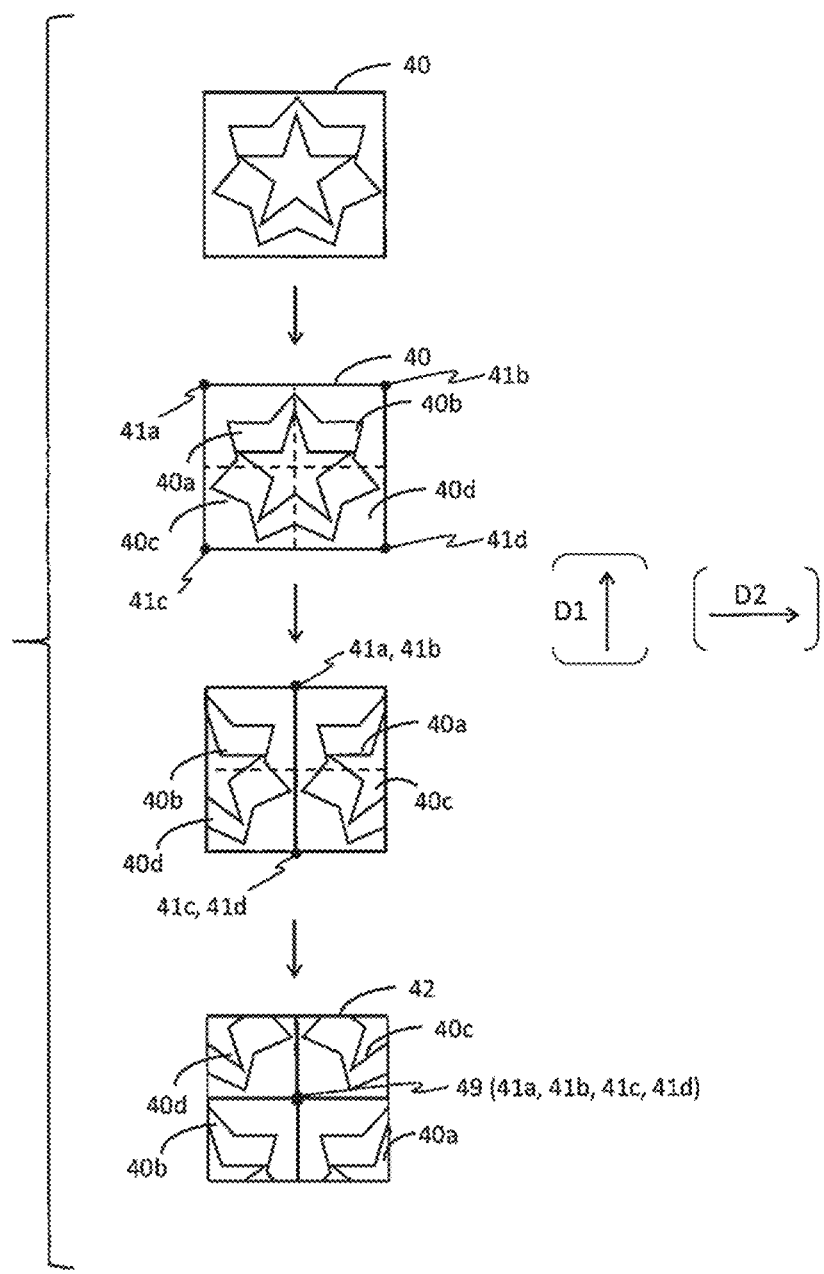
FIG. 5 is a diagram for explaining a procedure of a division data shift on pattern image data.

A procedure of the division data shift for the pattern image data will be described with reference to FIG. 5. FIG. 5 illustrates pattern image data 40 registered in step S100. A pattern represented by the pattern image data 40 corresponds to a "first pattern". A shape of the pattern image data 40 may be interpreted as a rectangle. In the example of FIG. 5, the pattern image data 40 represents the first pattern designed with a petal shape as a motif. Of course, such a pattern may be more complex. Note that, a first pattern similar to the pattern image data 40 is repeatedly formed in the fabric 30 along each of the transport direction D1 and the width direction D2. In the present exemplary embodiment, an orientation of each image data, such as pattern image data, imaging data, and printing image data handled by the control unit 11 will also be described corresponding to the transport direction D1 and the width direction D2. Furthermore, the transport direction D1 is also simply referred to as a vertical direction, and the width direction D2 as a horizontal direction.

The pattern correction unit 12b divides the pattern image data 40 into two equal portions in each of the vertical direction and the horizontal direction to divide the pattern image data 40 into four divided pattern image data 40a, 40b, 40c, and 40d. The divided pattern image data 40a, 40b, 40c, and 40d have four corner vertices 41a, 41b, 41c, and 41d of the pattern image data 40, one for each. In the example of FIG. 5, the divided pattern image data 40a has the vertex 41a, the divided pattern image data 40b has the vertex 41b, the divided pattern image data 40c has the vertex 41c, and the divided pattern image data 40d has the vertex 41d.

The pattern correction unit 12b changes a mutual positional relationship among the divided pattern image data 40a, 40b, 40c, and 40d so that the vertices 41a, 41b, 41c, and 41d overlap at a single point. Although it is not necessary to fix a positional change order, according to FIG. 5, the pattern correction unit 12b first moves a set of the divided pattern image data 40b and 40d, which are closest to an end in a positive direction in the width direction D2 to a position of an end in a negative direction in the width direction D2, in the positional relationship among the divided pattern image data 40a, 40b, 40c, and 40d. In other words, a position of a set of the divided pattern image data 40a and 40c, and the position of the set of the divided pattern image data 40b and 40d are replaced. At this point, the vertex 41a and the vertex 41b overlap, and the vertex 41c and the vertex 41d overlap.

In such a replaced state, the pattern correction unit 12b further moves a set of the divided pattern image data 40d and 40c, which are closest to an end in an upstream direction in the transport direction D1, to a position of an end in a downstream direction in the transport direction D1. In other words, a position of a set of the divided pattern image data 40b and 40a, and the position of the set of the divided pattern image data 40d and 40c are replaced. As a result, corrected pattern image data 42 is generated in which a point 49 where the vertices 41a, 41b, 41c, and 41d overlap is a center. As described above, when the pattern image data 40 is the rectangle, the corrected pattern image data 42 is also a rectangle. A pattern represented by the corrected pattern image data 42 corresponds to a "second pattern". Note that, it goes without saying that solid lines and broken lines for partitioning the divided pattern image data 40a, 40b, 40c, and 40d illustrated in the pattern image data 40 and in the corrected pattern image data 42 in FIG. 5 are not actually present, and do not constitute the first pattern and the second pattern.

In step S120, the control unit 11 causes the imaging unit 15 to start imaging with the fabric 30 as a target that the transport unit 16 transports at predetermined velocity. That is, in step S120, a "transport step" of the fabric 30 is started. In addition, an "imaging step" is started by step S120. Image data on a line-by-line basis generated by the imaging of the fabric 30 by the imaging unit 15 is sequentially output to the control unit 11. The control unit 11 acquires two-dimensional imaging data, by sequentially storing the image data on a line-by-line basis from the imaging unit 15. The imaging data corresponds to "second image data".

In step S130, the pattern extracting unit 12c compares corrected pattern image data converted from the pattern image data by the division data shift in step S110 with the imaging data generated by the imaging in step S120 to extract a pattern region corresponding to the second pattern represented by the corrected pattern image data from captured image data. In the imaging data generated by the imaging of the fabric 30, of course, a plurality of the first patterns are represented side by side. Step S130 corresponds to a "pattern extraction step".

It is sufficient that the pattern extracting unit 12c uses an image recognition technology to extract, as a pattern region, an image region having a degree of similarity with the corrected pattern image data that is higher than a predetermined level. Specifically, the pattern extracting unit 12c extracts an edge of an image in the corrected pattern image data, and similarly extracts an edge of an image in the imaging data. Then, an edge distribution in the corrected pattern image data is repeatedly compared with an edge distribution in the imaging data, while a position is shifted, and while the corrected pattern image data is deformed, and a region in which a degree of match between the edge distributions is highly evaluated above a predetermined level is extracted as one pattern region. Note that, as in the process in step S130, in step S106 described above, the pattern registration unit 12a can extract a pattern region in pre-scan data according to a degree of match of edge distributions between images to be compared.

Here, when the width direction D2 is taken as an X-axis, and the transport direction D1 is taken as a Y-axis, coordinates of imaging data are defined in a two-dimensional plane according to the orthogonal X- and Y-axes. Accordingly, the process of extracting a pattern region from imaging data is a process of identifying coordinates of the pattern region in the imaging data. More specifically, the pattern extracting unit 12c acquires center coordinates of a region in imaging data that can be evaluated as one pattern region in accordance with the degree of match of edge distributions as described above as an extraction result of one pattern region. The pattern extracting unit 12c outputs information of the center coordinates of the pattern region acquired as the extraction result to the printing image generation unit 12e for processes in steps S140 and S150.

Figure 6:
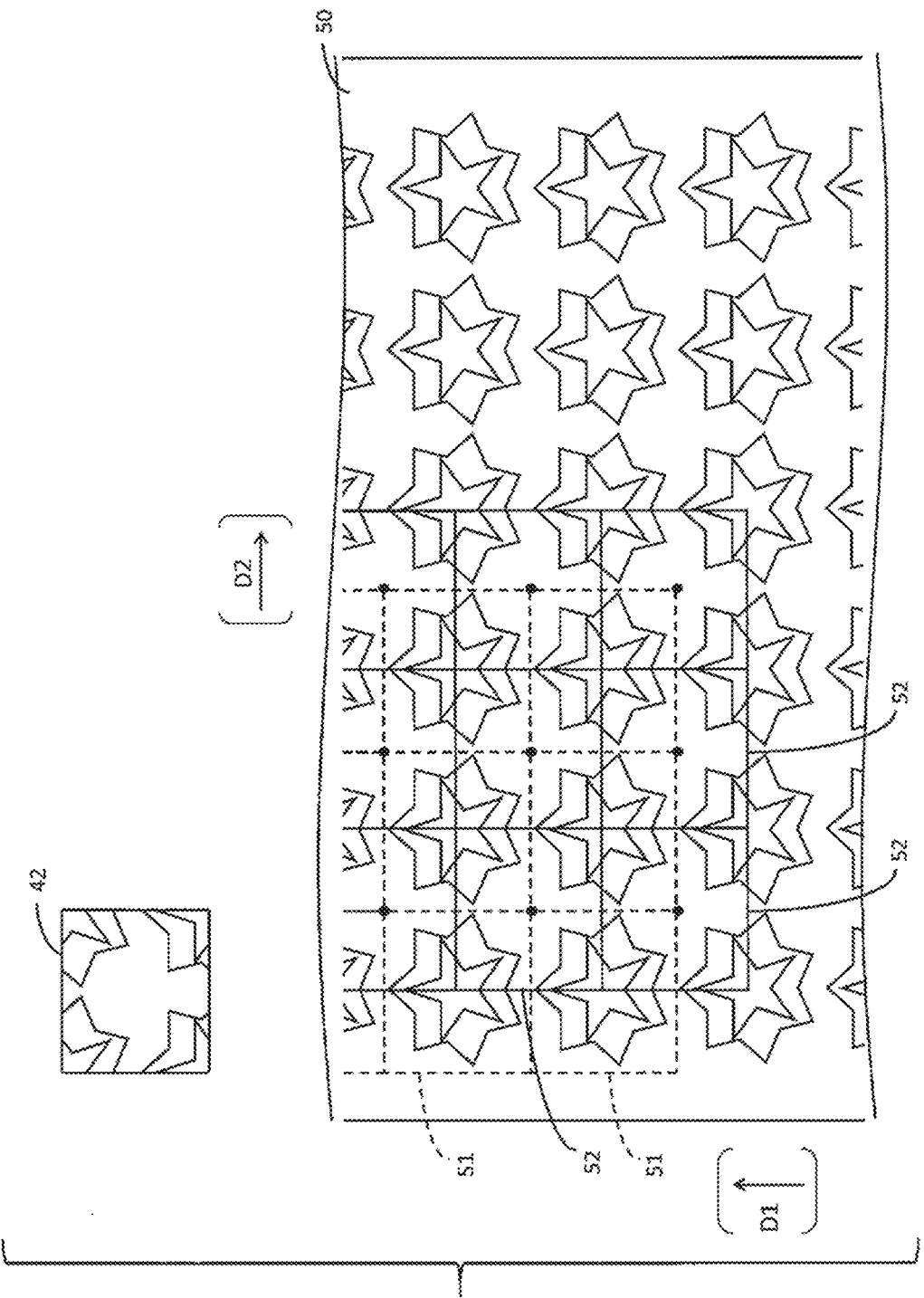
FIG. 6 is a diagram for explaining step S130 of the first exemplary embodiment by a specific example.

A specific example of step S130 will be described with reference to FIG. 6. FIG. 6 illustrates a part of imaging data 50. Further, the corrected pattern image data 42 is also illustrated in FIG. 6 for reference. In the imaging data 50, a first pattern similar to the pattern image data 40 is repeatedly represented along each of the transport direction D1 and the width direction D2. Each rectangle indicated by dashed lines in the imaging data 50 is a pattern region 51 corresponding to such a first pattern. On the other hand, each rectangle indicated by solid lines in the imaging data 50 is a pattern region 52 corresponding to a second pattern represented by the corrected pattern image data 42. In other words, the pattern extracting unit 12c acquires information of center coordinates of each pattern region 52 from a plurality of locations in the imaging data 50 by performing extraction based on the corrected pattern image data 42. In FIG. 6, the center coordinates of each pattern region 52 are indicated by a black circle. As can be seen from FIG. 6, the center coordinates of each pattern region 52 correspond to four corners of the respective pattern regions 51.

In step S140, the printing image generation unit 12e deforms colored image data that represents an image to be printed overlaid on the first pattern so as to match a shape of a region having the center coordinates of the pattern regions extracted in step S130 as four corners. The colored image data corresponds to "third image data". The colored image data is pre-generated color image data representing a color to color one first pattern, or a print range of a color. The colored image data is stored in advance in the storage unit 18, for example. Alternatively, the control unit 11 is input with colored image data stored in a PC from the PC external to the printing apparatus 10, for example, in accordance with a user operation, and stores the input colored image data in the storage unit 18.

In the imaging data, the center coordinates of the respective pattern regions are ideally present at constant intervals along each of the transport direction D1 and the width direction D2. In addition, the pattern region is ideally a rectangle in which each of vertical and lateral lengths has a predetermined value. However, distortion, expansion and contraction (hereinafter, distortion, and the like) may be generated in the fabric 30 being transported. Although not particularly depicted in FIG. 6, and FIGS. 7, 9, 10, 12, and 14 described below, intervals, an arrangement direction, and the like of the center coordinates of the plurality of pattern regions extracted from the imaging data in step S130 or the like may also be arranged in an affected manner such as such distortion.

Thus, the printing image generation unit 12e deforms the shape of the colored image data so as to match the shape of each of the regions having the center coordinates extracted in step S130 as the four corners. As a deformation method, for example, an affine transformation including expansion, contraction, rotation, shear, and the like of an image, or another deformation method is used. Depending on the shape of the region having the center coordinates extracted in step S130 as the four corners, the deformation process in step S140 is unnecessary in some cases as a result.

In step S150, the printing image generation unit 12e arranges a plurality of the colored image data after step S140 corresponding to an arrangement of the regions each having the center coordinates extracted in step S130 in the imaging data as the four corners to generate printing image data. The printing image data is image data in which the plurality of colored image data after step S140 are combined, and is an image printed on a region of the fabric 30 as a target of imaging. Such steps S140 and S150 correspond to a "printing image generation step" of arranging third image data so as to match a region having, as four corners, centers of pattern regions extracted to generate printing image data.

Figure 7:
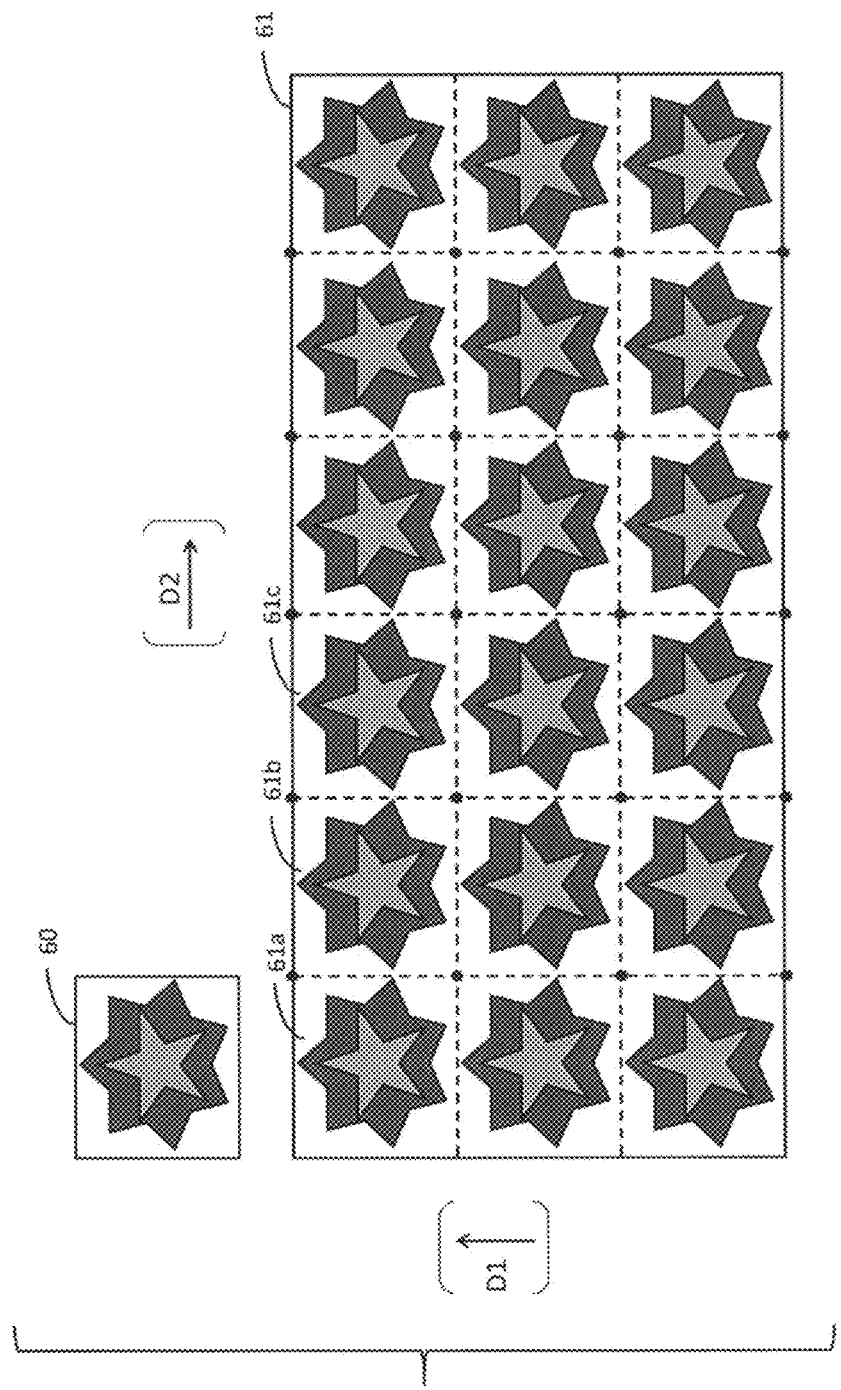
FIG. 7 is a diagram for explaining steps S140 and S150 of the first exemplary embodiment by a specific example.

A specific example of steps S140 and S150 will be described with reference to FIG. 7. A reference sign 60 denotes colored image data 60. In FIG. 7, the colored image data 60 is color image data representing colors to be colored overlaid on the first pattern designed with petals as a motif. The colored image data 60 may be interpreted as an image having the same or substantially the same size as the pattern image data 40 and the corrected pattern image data 42 vertically and horizontally. Also in FIG. 7, the center coordinates extracted in step S130 are indicated by a black circle, similar to FIG. 6. A reference sign 61a denotes colored image data 61a after the colored image data 60 is deformed so as to match a shape of one region (first region) having the center coordinates extracted in step S130 as four corners. Similarly, a reference sign 61b denotes colored image data 61b after the colored image data 60 is deformed so as to match a shape of one region (second region) having the center coordinates extracted in step S130 as four corners, that is adjacent to the first region in the width direction D2.

A reference sign 61c denotes colored image data 61c after the colored image data 60 is deformed so as to match a shape of one region (third region) having the center coordinates extracted in step S130 as four corners, that is adjacent to the second region in the width direction D2. Then, such colored image data 61a, 61b, 61c, and the like joined in accordance with a positional relationship among the first region, the second region, the third region, and the like in the imaging data 50 form printing image data 61. In FIG. 7, boundaries of the colored image data 61a, 61b, 61c, and the like are partially indicated by broken lines. Each of the first region, the second region, the third region, and the like corresponds to the pattern region 51. In other words, the printing image generation unit 12e can arrange the colored image data 60 so as to match a region having the center coordinates extracted in step S130 as four corners to arrange the colored image data 60 so as to match the pattern region 51 representing the first pattern as a result.

As indicated by a dashed arrow in FIG. 3, the control unit 11, after starting imaging of the fabric 30 in step S120, repeats steps S130 to S150 in accordance with the imaging data obtained sequentially from the imaging unit 15. In other words, the control unit 11 performs step S130 using imaging data of a predetermined size obtained sequentially from the imaging unit 15 as a target, and performs steps S140 and S150 in response to a result of step S130. The printing image data 61 illustrated in FIG. 7 may be interpreted as an example of the printing image data obtained as a result of one cycle of such steps S130 to S150.

In step S160, the printing control unit 12f starts printing of the printing image data generated in step S150 on the fabric 30. In other words, a "printing step" is started by step S160. The printing image generation unit 12e sequentially generates printing image data by repeating steps S140 and S150, and outputs the printing image data sequentially to the printing control unit 12f in an order of generation. The printing control unit 12f appropriately performs various types of necessary processing such as so-called color conversion processing and halftone processing on the printing image data acquired from the printing image generation unit 12e, to convert the printing image data into printing image data in a format used by the printing unit 17 for printing. The printing control unit 12f may temporarily accumulate the printing image data after such conversion in a buffer.

Then, the printing control unit 12f transfers the printing image data after the above conversion to the printing unit 17, and causes the printing unit 17 to start printing by movement of the carriage 20 and ink discharge from the printing head 19 based on the printing image data at predetermined timing at which a position of the fabric 30 for which imaging is started by step S120 reaches below the printing head 19. As a result, color images represented by the individual colored image data constituting the printing image data are printed overlaid on the pattern in a shape that matches the individual pattern in the fabric 30.

The transport unit 16 is provided with an encoder that detects an amount of rotation of rollers and belts rotating for transport. The printing control unit 12f computes a transport distance of the fabric 30 in accordance with a detection signal from the encoder. Accordingly, the printing control unit 12f can grasp a current position in the transport direction D1 of the fabric 30 for which imaging is started by step S120, and can cause the printing unit 17 to start printing on the fabric 30 at timing at which the position reaches below the printing head 19.

After printing is started in step S160, the control unit 11 determines whether to end the printing or not (step S170). When ending the printing, the control unit 11 determines "Yes" and proceeds to an end process in step S180. The control unit 11 determines to end the printing when, for example, the end of printing is instructed by a user, or when the transport of the fabric 30 by a predetermined length is completed.

In the end process in step S180, the control unit 11 stops imaging of the fabric 30 by the imaging unit 15. In addition, the control unit 11 stops driving the transport unit 16 and the printing unit 17 after causing the printing unit 17 to perform printing based on the printing image data generated in one cycle of the last steps S130 to S150, and ends the flowchart in FIG. 3. Of course, the control unit 11 may stop the transport unit 16 after controlling a necessary process such as collection of the fabric 30 by a winding roller.

3. Second Exemplary Embodiment

Next, a second exemplary embodiment will be described.

Figure 8:
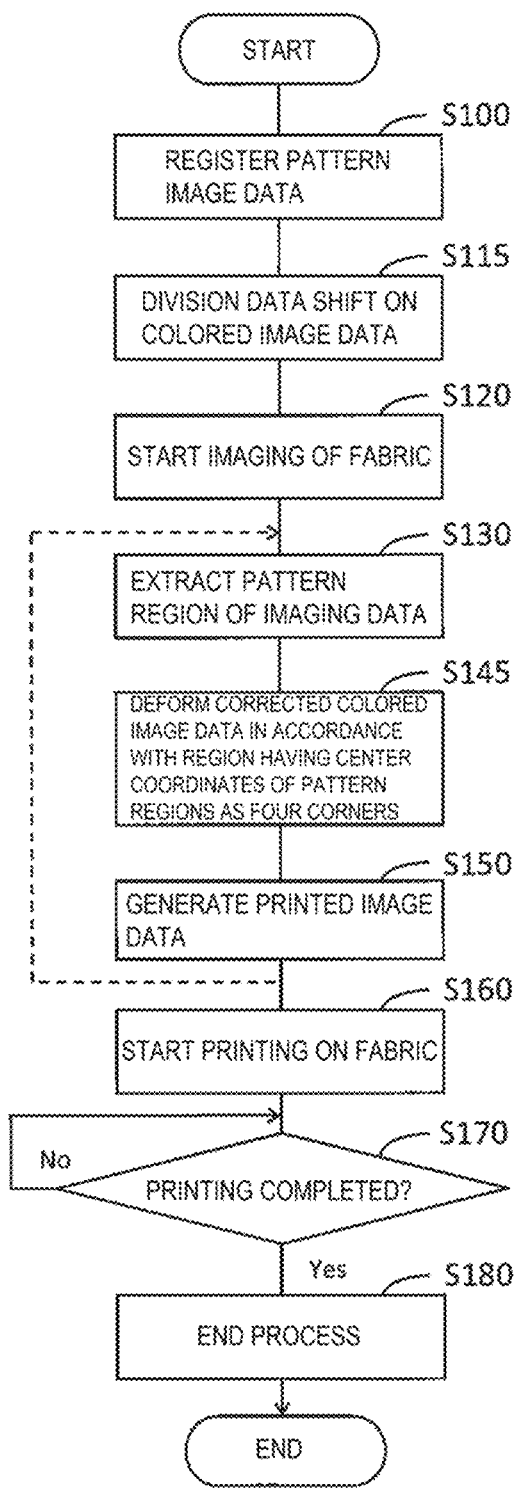
FIG. 8 is a flowchart illustrating printing processing according to a second exemplary embodiment.

FIG. 8 illustrates, by a flowchart, printing processing according to the second exemplary embodiment that the control unit 11 performs in accordance with the program 12. The second exemplary embodiment, in outline, differs from the first exemplary embodiment in that a division data shift is performed on colored image data rather than on pattern image data. The flowchart in FIG. 8 has step S115 instead of step S110, and step S145 instead of step S140, as compared to FIG. 3. In the second exemplary embodiment, descriptions of contents common to those of the first exemplary embodiment are omitted.

In step S115, the image correction unit 12d performs a division data shift on colored image data. That is, the colored image data is divided into a plurality of divided pieces of color image data, and a mutual positional relationship among the divided color image data is changed to convert the colored image data into corrected colored image data having a center made up of four corners of the colored image data. The divided colored image data corresponds to "divided third image data", and the corrected colored image data corresponds to "corrected third image data". Step S115 corresponds to an "image correction step". A procedure of converting the colored image data to the corrected colored image data may be performed by applying the procedure illustrated in FIG. 5 in which the pattern image data 40 is converted into the corrected pattern image data 42 by the pattern correction unit 12b, thus description thereof is omitted here.

In the second exemplary embodiment, the pattern image data is not subjected to the division data shift. Therefore, in step S130, the pattern extracting unit 12c compares pattern image data registered in step S100 with imaging data generated by imaging in step S120, to extract a pattern region corresponding to a first pattern represented by the pattern image data from captured image data. That is, the pattern extracting unit 12c acquires center coordinates of a region in the imaging data that can be evaluated as one pattern region in accordance with a degree of match with an edge distribution of the pattern image data, as an extraction result of the one pattern region. The pattern extracting unit 12c outputs the information of the center coordinates of the pattern region acquired as the extraction result to the printing image generation unit 12e for processes in steps S145 and S150.

Figure 9:
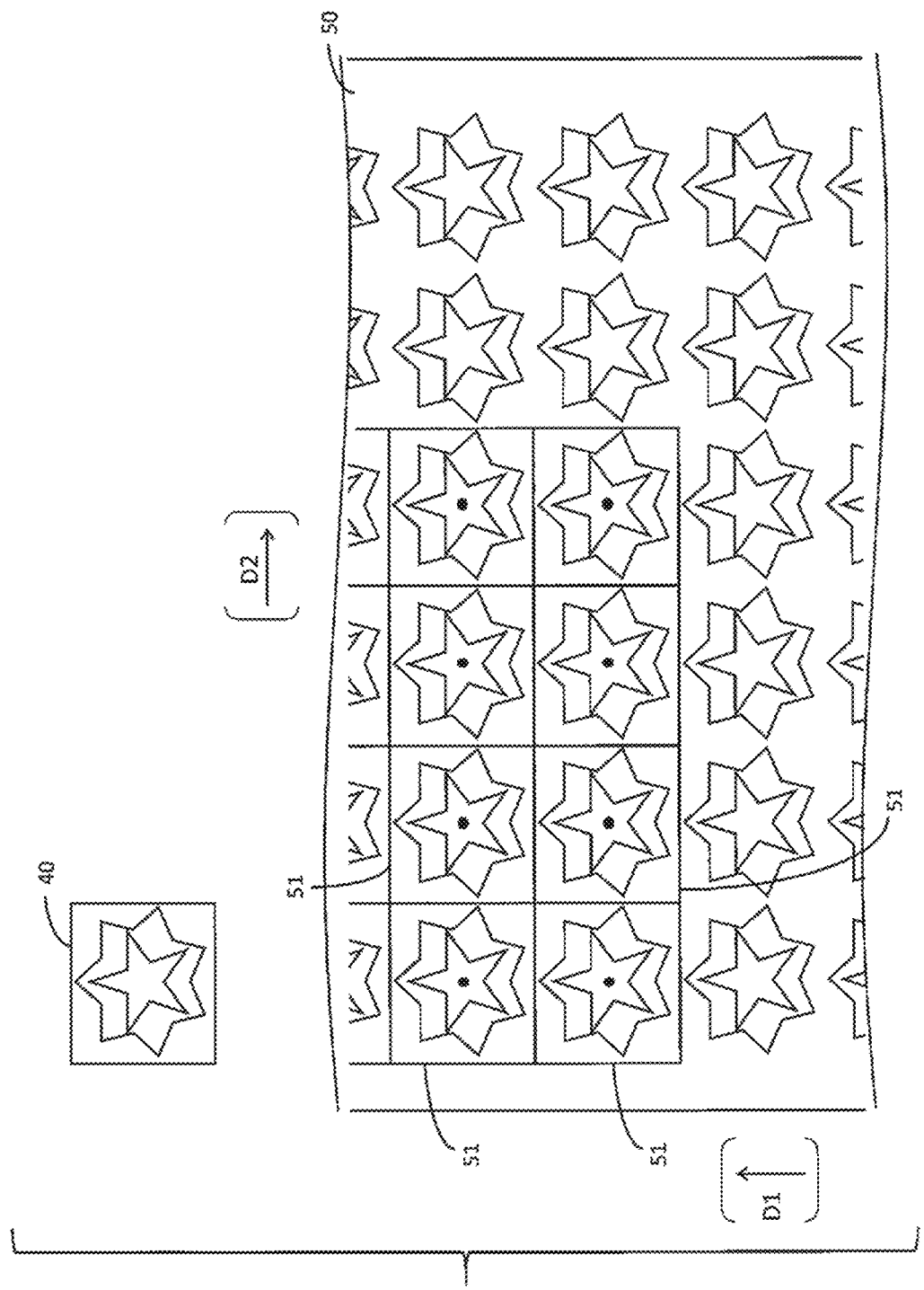
FIG. 9 is a diagram for explaining step S130 of the second exemplary embodiment by a specific example.

A specific example of step S130 of the second exemplary embodiment will be described with reference to FIG. 9. FIG. 9 illustrates a part of the imaging data 50 similar to FIG. 6. Additionally, the pattern image data 40 is also illustrated in FIG. 9 for reference. Each rectangle indicated by solid lines in the imaging data 50 in FIG. 9 is the pattern region 51 corresponding to the first pattern represented by the pattern image data 40. The pattern extracting unit 12c acquires information of center coordinates of each pattern region 51 from a plurality of locations in the imaging data 50 by performing extraction based on the pattern image data 40. In FIG. 9, the center coordinates of each pattern region 51 are indicated by a black circle. As can be seen by reference to FIG. 9 in conjunction with FIG. 6, the center coordinates of the pattern regions 51 correspond to four corners of the pattern region 52. Step S130 of the second exemplary embodiment corresponds to a "pattern extraction step" in which the pattern region corresponding to the first pattern is extracted from second image data.

In step S145, the printing image generation unit 12e deforms the corrected colored image data obtained by the division data shift in step S115 so as to match a shape of a region having the center coordinates of the pattern regions extracted in step S130 as four corners. The corrected colored image data can be said to be color image data representing an image to be printed overlaid on a second pattern. For step S145, the description of step S140 is to be applied appropriately. In step S150, the printing image generation unit 12e arranges a plurality of the corrected colored image data after step S145 corresponding to an arrangement of the regions each having the center coordinates extracted in step S130 in the imaging data as the four corners to generate printing image data. Steps S145 and S150 correspond to a "printing image generation step" of arranging the corrected third image data so as to match the region having the centers of the extracted pattern regions as the four corners to generate printing image data.

Figure 10:
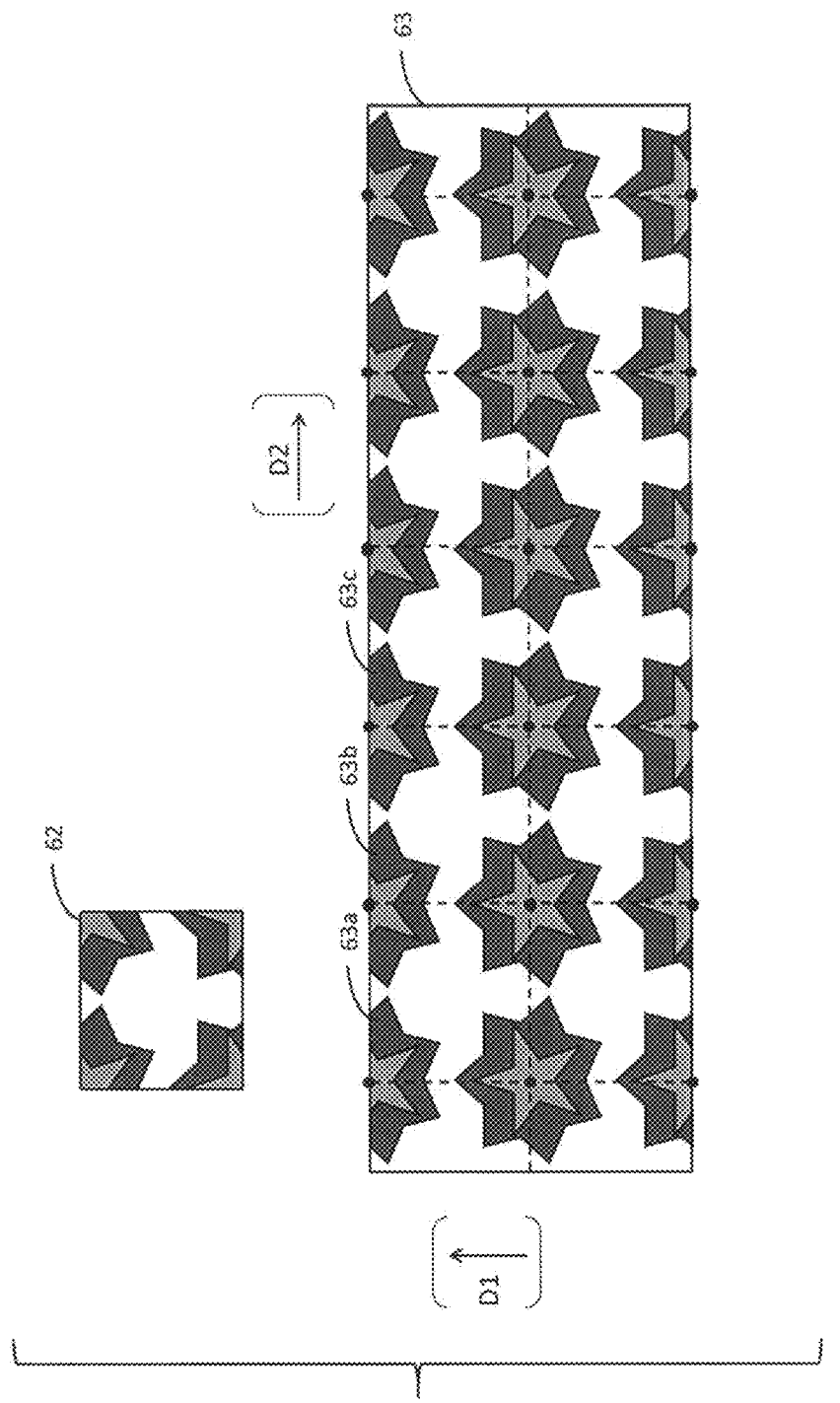
FIG. 10 is a diagram for explaining steps S145 and S150 of the second exemplary embodiment by a specific example.

A specific example of steps S145 and S150 of the second exemplary embodiment will be described with reference to FIG. 10. A reference sign 62 denotes corrected colored image data 62 obtained by the division data shift in step S115. The corrected colored image data 62 is, similar to the colored image data 60, an image having the same or substantially the same size as the pattern image data 40 and the corrected pattern image data 42 vertically and laterally. In FIG. 10, the center coordinates extracted in step S130 are indicated by a black circle, similar to FIG. 9. A reference sign 63a denotes corrected colored image data 63a after the corrected colored image data 62 is deformed so as to match a shape of one region (fourth region) having the center coordinates extracted in step S130 as four corners. Similarly, a reference sign 63b denotes corrected colored image data 63b after the corrected colored image data 62 is deformed so as to match a shape of one region (fifth region) having the center coordinates extracted in step S130 as four corners, that is adjacent to the fourth region in the width direction D2.

A reference sign 63c denotes corrected colored image data 63c after the corrected colored image data 62 is deformed so as to match a shape of one region (sixth region) having the center coordinates extracted in step S130 as four corners, that is adjacent to the fifth region in the width direction D2. Then, such corrected colored image data 63a, 63b, 63c, and the like joined in accordance with a positional relationship among the fourth region, the fifth region, the sixth region, and the like in the imaging data 50 form printing image data 63. In FIG. 10, boundaries of the corrected colored image data 63a, 63b, 63c, and the like are partially illustrated by broken lines. Each of the fourth region, the fifth region, the sixth region, and the like corresponds to the pattern region 52. In other words, the printing image generation unit 12e can arrange the corrected colored image data 62 so as to match a region having the center coordinates extracted in step S130 as four corners to arrange the corrected colored image data 62 so as to match the pattern region 52 representing the second pattern. A result of arranging the corrected colored image data 62 so as to match the pattern region 52 representing the second pattern is substantially the same as a result of arranging the colored image data 60 so as to match the pattern region 51 representing the first pattern.

4. Summary of First and Second Exemplary Embodiments

As described above, according to the first exemplary embodiment, the printing apparatus 10 includes the transport unit 16 configured to transport the fabric 30 formed with a first pattern in the transport direction D1, the imaging unit 15 configured to image the fabric 30 transported by the transport unit 16, and the printing unit 17 configured to perform printing on the fabric 30 transported by the transport unit 16. Further, the printing apparatus 10 includes the pattern correction unit 12b configured to change a mutual positional relationship among a plurality of divided pieces of first image data obtained by dividing first image data representing the first pattern to generate corrected first image data having a center made up of four corners of the first image data, the pattern extracting unit 12c configured to compare the corrected first image data with second image data generated by imaging the fabric 30 by the imaging unit 15 to extract a pattern region corresponding to a second pattern represented by the corrected first image data from the second image data, the printing image generation unit 12e configured to arrange third image data representing an image to be printed overlaid on the first pattern so as to match a region having, extracted as four corners, centers of the pattern regions to generate printing image data, and the printing control unit 12f configured to cause the printing unit 17 to print the printing image data on the fabric 30.

As an extraction result of the pattern region from the imaging data of the fabric 30, only limited information, such as the center coordinates of the pattern region, is obtained. Therefore, in the past, with reference to center coordinates as an extraction result based on pattern image data, a shape of a pattern region needs to be further fixed by determining four corner vertices of the pattern region using interpolation calculations or the like, and then colored image data needs to be arranged so as to match the shape of the pattern region.

With respect to this problem, the pattern correction unit 12b converts first image data into corrected first image data having a center made up of four corners thereof by a division data shift, and the pattern extracting unit 12c extracts, from second image data, a pattern region corresponding to a second pattern represented by the corrected first image data, based on the corrected first image data. As a result, the printing image generation unit 12e, by simply arranging third image data so as to match a region having center coordinates of the pattern regions as extraction results as four corners, can generate printing image data in which the third image data accurately overlaps a first pattern of the fabric 30. That is, there is no need to perform the interpolation operations and the like as described above in order to arrange the third image data, and a computation burden on the processor is reduced. As a result, a processing speed for generating the printing image data is improved.

Additionally, according to the second exemplary embodiment, the printing apparatus 10 includes the transport unit 16 configured to transport the fabric 30 formed with a first pattern in the transport direction D1, the imaging unit 15 configured to image the fabric 30 transported by the transport unit 16, and the printing unit 17 configured to perform printing on the fabric 30 transported by the transport unit 16. Additionally, the printing apparatus 10 includes the pattern extracting unit 12c configured to compare first image data representing the first pattern with second image data generated by imaging the fabric 30 by the imaging unit 15 to extract a pattern region corresponding to the first pattern from the second image data, the image correction unit 12d configured to change a mutual positional relationship among a plurality of divided pieces of third image data obtained by dividing third image data representing an image to be printed overlaid on the first pattern to generate corrected third image data having a center made up of four corners of the third image data, the printing image generation unit 12e configured to arrange the corrected third image data so as to match a region having, as four corners, centers of the pattern regions extracted to generate printing image data, and the printing control unit 12f configured to cause the printing unit 17 to print the printing image data on the fabric 30.

In other words, with respect to the above-described problems, the pattern extracting unit 12c extracts the pattern region corresponding to the first pattern represented by the first image data from the second image data based on the first image data, and the image correction unit 12d converts the third image data into the corrected third image data in which the four corners thereof become the center by the division data shift. As a result, the printing image generation unit 12e, by simply arranging the corrected third image data so as to match the region having the center coordinates of the pattern regions as extraction results, as the four corners, can generate the printing image data in which the third image data accurately overlaps the first pattern of the fabric 30. That is, in the second exemplary embodiment as well, similar to the first exemplary embodiment, there is no need to perform the interpolation operations or the like as described above, and a computation burden on the processor is reduced. As a result, a processing speed for generating the printing image data is improved.

The present exemplary embodiment also discloses an invention of various categories, such as a system, a program, and a method other than the printing apparatus 10.

A printing method according to the first exemplary embodiment includes a transport step for transporting the fabric 30 formed with a first pattern in the transport direction D1, an imaging step for imaging the fabric 30 transported, a pattern correction step for changing a mutual positional relationship among a plurality of divided pieces of first image data obtained by dividing first image data representing the first pattern to generate corrected first image data having a center made up of four corners of the first image data, a pattern extraction step for comparing the corrected first image data with second image data generated by imaging the fabric 30 to extract a pattern region corresponding to a second pattern represented by the corrected first image data from the second image data, a printing image generation step for arranging third image data representing an image to be printed overlaid on the first pattern so as to match a region having, as four corners, centers of the pattern regions extracted to generate printing image data, and a printing step for printing the printing image data on the fabric 30 transported.

A printing method according to the second exemplary embodiment includes a transport step for transporting the fabric 30 formed with a first pattern in the transport direction D1, an imaging step for imaging the fabric 30 transported, a pattern extraction step for comparing first image data representing the first pattern with second image data generated by imaging the fabric 30 to extract a pattern region corresponding to the first pattern from the second image data, an image correction step for changing a mutual positional relationship among a plurality of divided pieces of third image data obtained by dividing third image data representing an image to be printed overlaid on the first pattern to generate corrected third image data having a center made up of four corners of the third image data, a printing image generation step for arranging the corrected third image data so as to match a region having, as four corners, centers of the pattern regions extracted to generate printing image data, and a printing step for printing the printing image data on the fabric 30 transported.

5. Third Exemplary Embodiment

Next, a third exemplary embodiment will be described.

Figure 11:
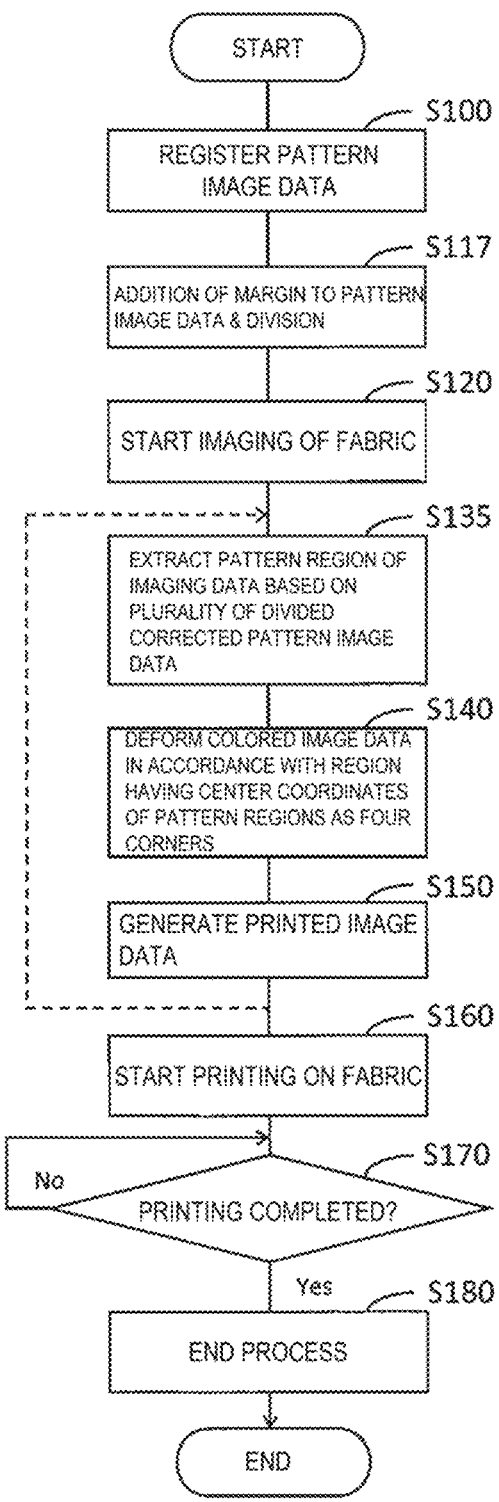
FIG. 11 is a flowchart illustrating printing processing according to a third exemplary embodiment.

FIG. 11 illustrates, by a flowchart, printing processing according to the third exemplary embodiment that the control unit 11 performs in accordance with the program 12. The flowchart in FIG. 11 has step S117 instead of step S110, and step S135 instead of step S130, as compared to FIG. 3. In the third exemplary embodiment, descriptions of contents common to those of the first exemplary embodiment or the second exemplary embodiment are omitted.

In the first exemplary embodiment or the second exemplary embodiment, the description has been given assuming a case in which a first pattern is repeatedly formed in the fabric 30. In contrast, in the third exemplary embodiment, a scene is assumed in which colored image data for coloring a first pattern is printed so as to match the fabric 30 in which one first pattern having a relatively large size is formed, for example, the fabric 30 for scarf, or the like. In the third exemplary embodiment, a division data shift is not performed.

In step S117, the pattern correction unit 12b adds a margin region to a circumference of pattern image data, and divides corrected pattern image data to which the margin region is added, thereby generating a plurality of divided pieces of corrected pattern image data having four corners of the pattern image data as respective centers. The divided corrected pattern image data corresponds to "divided corrected first image data". Step S117 corresponds to a "pattern correction step".

In step S135, the pattern extracting unit 12c compares the plurality of divided pieces of corrected pattern image data generated in step S117 with imaging data generated by imaging in step S120, to extract, from the imaging data, a plurality of pattern regions corresponding to patterns represented by the plurality of divided pieces of corrected pattern image data respectively. The pattern extracting unit 12c outputs information of the center coordinates of the pattern region acquired as the extraction result to the printing image generation unit 12e for processes in steps S140 and S150. Step S135 corresponds to a "pattern extraction step".

A flow of steps S117, S135, S140, and 150 of the third exemplary embodiment will be described in detail with reference to FIG. 12. A reference sign 43 illustrates pattern image data 43 representing the first pattern formed in the fabric 30. A reference sign 53 illustrates imaging data 53 of the fabric 30, and a reference sign 64 illustrates colored image data 64 corresponding to the first pattern.

In step S117, the pattern correction unit 12b first adds a margin region 45 to a circumference of the pattern image data 43 to generate corrected pattern image data 46. When a vertical length of the pattern image data 43 is H, and a horizontal length is W, the pattern correction unit 12b sets a vertical length of the corrected pattern image data 46 including the margin region 45 to be 2×H, and a horizontal length to be 2×W. In the corrected pattern image data 46, the pattern image data 43 is arranged centrally.

In step S117, the pattern correction unit 12b further divides the corrected pattern image data 46 into two equal portions in each of the vertical direction and the horizontal direction to divide the corrected pattern image data 46 into four divided corrected pattern image data 46a, 46b, 46c, and 46d. According to FIG. 12, the divided corrected pattern image data 46a has a vertex 44a as a center, which is one of four corner vertices of the pattern image data 43. Similarly, the divided corrected pattern image data 46b has a vertex 44b as a center, which is one of the four corner vertices of the pattern image data 43. The divided corrected pattern image data 46c has a vertex 44c as a center, which is one of the four corner vertices of the pattern image data 43. The divided corrected pattern image data 46d has a vertex 44d as a center, which is one of the four corner vertices of the pattern image data 43.

In step S135, the pattern extracting unit 12c compares each of the divided corrected pattern image data 46a, 46b, 46c, and 46d with the imaging data 53, to extract, from the imaging data 53, a plurality of pattern regions 53a, 53b, 53c, and 53d corresponding to patterns represented by the divided corrected pattern image data 46a, 46b, 46c, and 46d, respectively. Note that, it is sufficient for the pattern extracting unit 12c to add a blank region to a circumference of the imaging data 53 as well as necessary, to make a size of the imaging data 53 equal to or greater than a size of the corrected pattern image data 46, in order to compare the divided corrected pattern image data 46a, 46b, 46c, and 46d with the imaging data 53.

Figure 12:
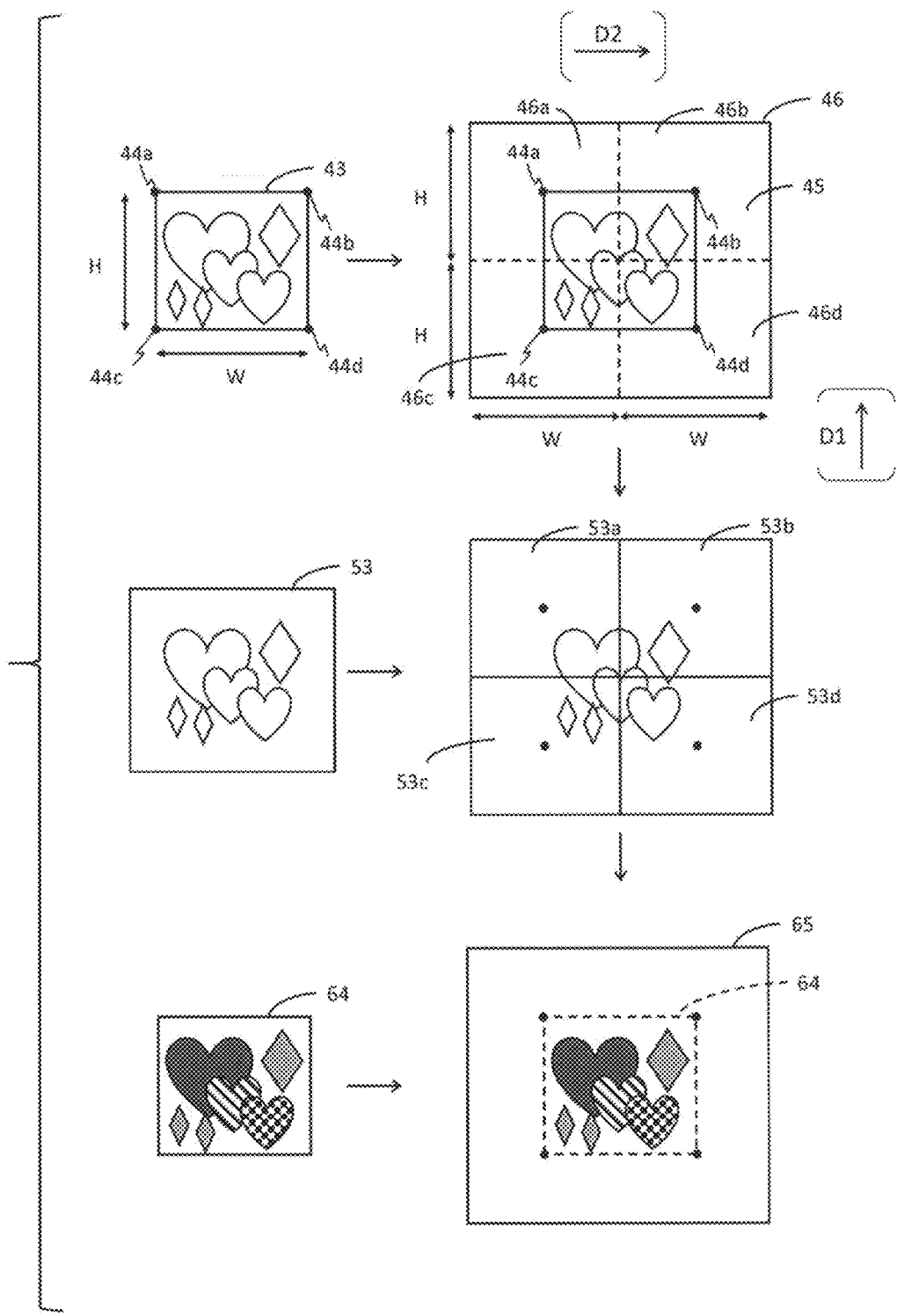
FIG. 12 is a diagram for explaining the third exemplary embodiment by a specific example.

According to FIG. 12, the pattern region 53a is a pattern region corresponding to the divided corrected pattern image data 46a. Additionally, the pattern region 53b corresponds to the divided corrected pattern image data 46b, the pattern region 53c corresponds to the divided corrected pattern image data 46c, and the pattern region 53d corresponds to the divided corrected pattern image data 46d. In FIG. 12, center coordinates of each of the pattern regions 53a, 53b, 53c, and 53d are indicated by a black circle. In other words, in step S135, the pattern extracting unit 12c acquires information of the center coordinates of each of the pattern regions 53a, 53b, 53c, and 53d as an extraction result, and outputs the information to the printing image generation unit 12e.

In steps S140 and S150, the printing image generation unit 12e generates printing image data 65 in which the colored image data 64 is arranged while the colored image data 64 is deformed as necessary so as to match a region having the center coordinates of the respective pattern regions 53a, 53b, 53c, and 53d extracted in step S135 as four corners. In this manner, the printing image generation unit 12e can arrange the colored image data 64 so as to match the region having the center coordinates extracted in step S135 as the four corners, to arrange the colored image data 64 so as to match the region of the imaging data 53 representing the first pattern.

As described above, according to the third exemplary embodiment, the printing apparatus 10 includes the transport unit 16 configured to transport the fabric 30 formed with a first pattern in the transport direction D1, the imaging unit 15 configured to image the fabric 30 transported by the transport unit 16, and the printing unit 17 configured to perform printing on the fabric 30 transported by the transport unit 16. Further, the printing apparatus 10 includes the pattern correction unit 12b configured to divide corrected first image data obtained by adding a margin region around first image data representing the first pattern to generate a plurality of divided pieces of corrected first image data having four corners of the first image data as respective centers, the pattern extracting unit 12c configured to compare the plurality of divided pieces of corrected first image data with second image data generated by imaging the fabric 30 by the imaging unit 15 to extract, from the second image data, a plurality of pattern regions corresponding to patterns represented by the plurality of divided pieces of corrected first image data respectively, the printing image generation unit 12e configured to arrange third image data representing an image to be printed overlaid on the first pattern so as to match a region having, as four corners, centers of the pattern regions extracted to generate printing image data, and the printing control unit 12f configured to cause the printing unit 17 to print the printing image data on the fabric 30.

According to the configuration described above, the printing image generation unit 12e, by simply arranging the third image data so as to match the region having center coordinates of the pattern regions as the extraction results as the four corners, can generate printing image data in which the third image data accurately overlaps the first pattern of the fabric 30. That is, there is no need to perform the interpolation operations and the like as described above for fixing a shape of the pattern region, based on the center coordinates of the pattern regions extracted from the imaging data. As a result, a computation burden on the processor is reduced, and a processing speed for generating the printing image data is improved.

A printing method according to the third exemplary embodiment includes the transport step for transporting the fabric 30 formed with a first pattern in the transport direction D1, an imaging step for imaging the fabric 30 transported, a pattern correction step for dividing corrected first image data obtained by adding a margin region around first image data representing the first pattern to generate a plurality of divided pieces of corrected first image data having four corners of the first image data as respective centers, a pattern extraction step for comparing the plurality of divided pieces of corrected first image data with second image data generated by imaging the fabric 30 to extract, from the second image data, a plurality of pattern regions corresponding to patterns represented by the plurality of divided pieces of corrected first image data respectively, a printing image generation step for arranging third image data representing an image to be printed overlaid on the first pattern so as to match a region having, as four corners, centers of the pattern regions extracted to generate printing image data, and a printing step for printing the printing image data on the fabric 30 transported.

6. Modified Examples

Several modified examples included in the present exemplary embodiment will be described.

First Modified Example

The control unit 11 may select and perform either the first exemplary embodiment or the third exemplary embodiment in accordance with a type of pattern formed in the fabric 30. A user determines whether a certain pattern, or a first pattern, is repeatedly formed in the fabric 30 used for printing, or one pattern is formed as a whole without such a repetition, and inputs a result of the determination to the control unit 11 through the operation receiving unit 14.

When the control unit 11 is input with a determination result from the user that the first pattern is repeatedly formed in the fabric 30, the control unit 11 performs the first exemplary embodiment with a division data shift. On the other hand, when the control unit 11 is input with a determination result from the user that there is no aspect in which the first pattern is repeated, and that one first pattern is formed in the fabric 30, the control unit 11 performs the third exemplary embodiment without the division data shift. Instead of performing the first exemplary embodiment, the control unit 11 may perform the second exemplary embodiment.

Second Modified Example

The number of divisions of pattern image data by a division data shift is not limited to four as described in FIG. 5.

Figure 13:
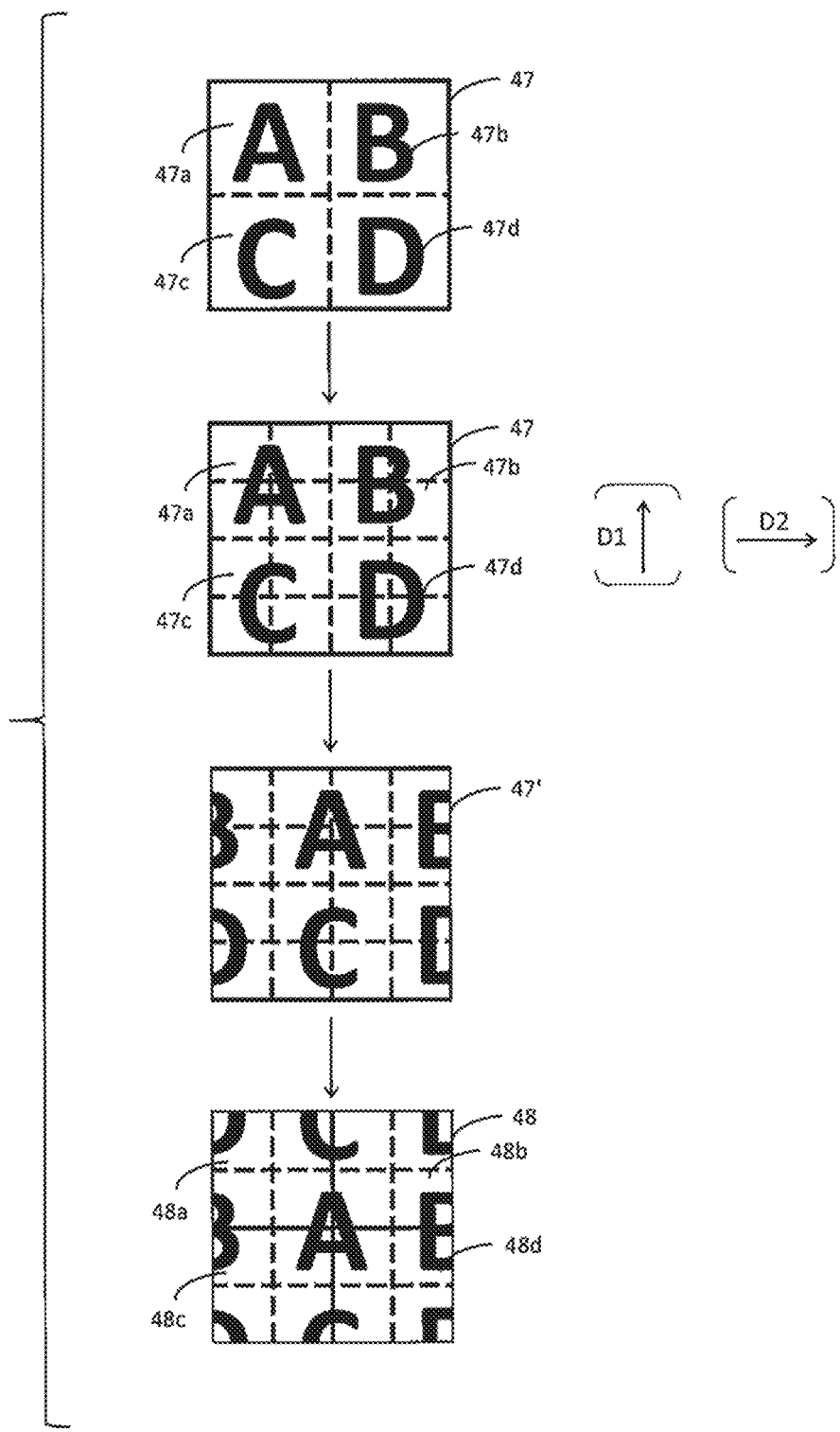
FIG. 13 is a diagram for explaining a division data shift of a second modified example.

FIG. 13 is a diagram for explaining the division data shift by step S110 in FIG. 3 in a second modified example, and illustrates an example different from that of FIG. 5. FIG. 13 illustrates pattern image data 47. In FIG. 13, partial patterns, which are parts of a first pattern represented by the pattern image data 47, are conveniently denoted by alphabets such as "A", "B", "C", and "D", respectively. Note that, each partial pattern is not actually the alphabet of "A", "B" or "D". A first pattern similar to the pattern image data 47 is repeatedly formed in the fabric 30 along each of the transport direction D1 and the width direction D2.

The pattern correction unit 12b divides the pattern image data 47 into two equal portions in each of the vertical direction and the horizontal direction to divide the pattern image data 47 into four regions 47a, 47b, 47c, and 47d. As can be seen from FIG. 13, the region 47a corresponds to the partial pattern "A". Similarly, the region 47b corresponds to the partial pattern "B", the region 47c corresponds to the partial pattern "C", and the region 47d corresponds to the partial pattern "D". In the second modified example, the pattern correction unit 12b further divides each of the regions 47a, 47b, 47c, and 47d into two equal portions in each of the vertical direction and the horizontal direction to divide the pattern image data 47 into 4×4 or a total of 16 divided pattern image data. A second stage from a top of FIG. 13 illustrates the pattern image data 47 in the 16-divided state.

For such pattern image data 47, the pattern correction unit 12b moves a column of the divided pattern image data present closest to an end in a positive direction in the width direction D2, to a position of an end in a negative direction in the width direction D2 in a positional relationship among the respective divided pattern image data, to form pattern image data 47'. The pattern correction unit 12b, for the pattern image data 47', further moves a row of the divided pattern image data present closest to an end in an upstream direction in the transport direction D1, to a position of an end in a downstream direction in the transport direction D1 to form corrected pattern image data 48.

In the corrected pattern image data 48, regions 48a, 48b, 48c, and 48d obtained by dividing the corrected pattern image data 48 into two in each of the vertical direction and the horizontal direction are indicated separated by solid lines. That is, each of the regions 48a, 48b, 48c, and 48d is a collection of the four divided pattern image data. According to the division data shift illustrated in FIG. 13, it is understood that one of four corner vertices of each of the regions 47a, 47b, 47c, and 47d of the pattern image data 47 overlaps a center of each of the regions 48a, 48b, 48c, and 48d of the corrected pattern image data 48. For example, four corner vertices of the region 47a are centers of the respective regions 48a, 48b, 48c, and 48d. Also, four corner vertices of the region 47b are centers of the respective regions 48a, 48b, 48c, and 48d.

In the second modified example, it is sufficient that step S130 and subsequent steps of the first exemplary embodiment are performed, considering that each of the partial patterns "A", "B", "C", and "D" is the first pattern, and the patterns represented by the respective regions 48a, 48b, 48c, and 48d are second patterns. In other words, in step S130, the pattern extracting unit 12c compares each of the regions 48a, 48b, 48c, and 48d that constitute the corrected pattern image data 48 with imaging data, to extract each pattern region corresponding to each second pattern represented by the regions 48a, 48b, 48c, and 48d from captured image data.

Figure 14:
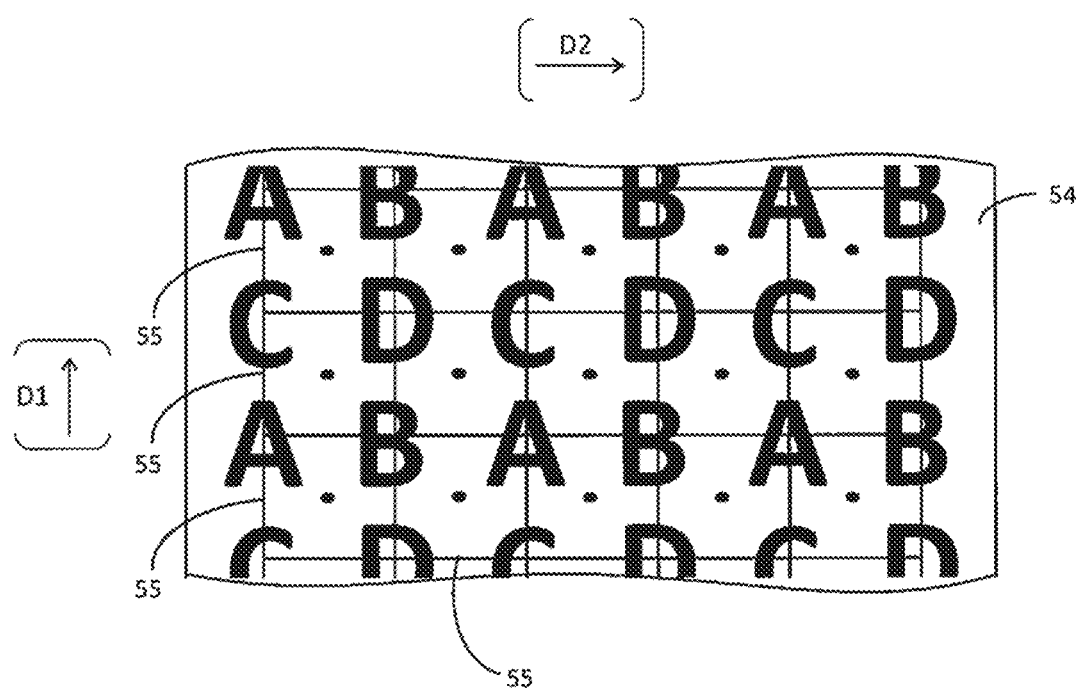
FIG. 14 is a diagram for explaining step S130 of the second modified example.

Assuming the contents of FIG. 13, step S130 in the second modified example will be described with reference to FIG. 14. FIG. 14 illustrates a part of imaging data 54. In the imaging data 54, a first pattern similar to the pattern image data 47 is repeatedly represented along each of the transport direction D1 and the width direction D2. Rectangles indicated by solid lines in the imaging data 54 are pattern regions 55 corresponding to the second patterns represented by the regions 48a, 48b, 48c, and 48d, respectively. In other words, the pattern extracting unit 12c performs extraction based on each of the regions 48a, 48b, 48c, and 48d that constitute the corrected pattern image data 48 to acquire information of center coordinates of the respective pattern regions 55 from a plurality of locations in the imaging data 54. In FIG. 14, the center coordinates of each pattern region 55 are indicated by a black circle. As can be seen from FIG. 14, the center coordinates of each pattern region 55 correspond to four corners of the respective partial patterns "A", "B", "C", and "D".

Accordingly, in steps S140 and S150 in the second modified example, the printing image generation unit 12e divides colored image data (not illustrated) to be printed overlaid on the pattern image data 47 in the same aspect as the aspect in which the pattern image data 47 is divided into the regions 47a, 47b, 47c, and 47d. Then, it is sufficient to arrange the image data of each region obtained by dividing the colored image data while deforming the image data so as to match a shape of a region having center coordinates of the pattern regions 55 extracted in step S130 as four corners to generate the printing image data.

The number of divisions of the pattern image data according to the second modified example is not limited to 16 as described for FIG. 13. For example, the pattern correction unit 12b may divide the pattern image data 47 into three equal portions in each of the vertical direction and the horizontal direction to divide the pattern image data 47 into nine regions, and may further divide each of these regions into two equal portions in each of the vertical direction and the horizontal direction, to divide the pattern image data 47 into 6×6 or a total of 36 divided pattern image data. In this case as well, it is sufficient that, similar to the description for FIG. 13, the pattern correction unit 12b performs the division data shift to generate corrected pattern image data, considers that each of nine rectangular regions constituted by collecting four divided pattern image data constituting the corrected pattern image data as a first pattern, and performs step S130 and the subsequent steps.

In addition, according to the relationship between the first exemplary embodiment and the second exemplary embodiment, the division data shift of the second modified example may, of course, be performed on colored image data rather than on pattern image data. That is, by comparing each of the regions 47a, 47b, 47c, and 47d constituting the pattern image data 47 with imaging data, the pattern extracting unit 12c extracts center coordinates of pattern regions corresponding to the first patterns represented by the region 47a, 47b, 47c, or 47d, respectively, from captured image data. Then, the image correction unit 12d performs the division data shift of the second modified example on the colored image data to generate corrected colored image data. It is sufficient that the printing image generation unit 12e arranges the image data of each region constituting the corrected colored image data while deforming the image data so as to match a shape of a region having, as four corners, center coordinates of the pattern regions extracted to generate printing image data.

Other Descriptions:

In the example in FIG. 2A, the configuration of a so-called serial printer has been disclosed in which the printing head 19 is moved while being mounted on the carriage 20, but the printing head 19 may be a so-called line type head. That is, the printing head 19 may be an elongated printing head that is not mounted on the carriage 20 and that can cover a width of the fabric 30 along the width direction D2.

In FIGS. 2A and 2B, the configuration denoted by the reference sign 22 need not be the endless belt, and may be a platen as a platform that supports the fabric 30 from below. That is, it may be understood that the fabric 30 transported by a roller (not illustrated) moves over the platen.

In the present exemplary embodiment, with respect to image data or a certain region in image data, a "center" thereof refers to, rather than only an exact center, but may also refer to a substantially central position including some errors or may be a centroid.

The present exemplary embodiment can also be applied to a case where a material other than the fabric 30, for example, a paper printing medium, formed with a pattern is used for printing.

What is claimed is:

1. A printing apparatus, comprising:
a transport unit configured to transport a fabric formed with a first pattern in a transport direction;
an imaging unit configured to image the fabric transported by the transport unit;
a printing unit configured to perform printing on the fabric transported by the transport unit;
a pattern correction unit configured to change a mutual positional relationship among a plurality of divided pieces of first image data obtained by dividing first image data representing the first pattern to generate corrected first image data having a center made up of four corners of the first image data;
a pattern extracting unit configured to compare the corrected first image data with second image data generated by imaging the fabric by the imaging unit to extract a pattern region corresponding to a second pattern represented by the corrected first image data from the second image data;
a printing image generation unit configured to arrange third image data representing an image to be printed overlaid on the first pattern so as to match a region having, as four corners, centers of a plurality of the pattern regions extracted to generate printing image data; and
a printing control unit configured to cause the printing unit to print the printing image data on the fabric.

\* \* \* \* \*